United States Patent
Nickolai et al.

(10) Patent No.: US 11,431,709 B2
(45) Date of Patent: Aug. 30, 2022

(54) AUTHENTICATION USING CLIENT LOGIN METRICS

(71) Applicant: INTERNATIONAL BUSINESS MACHINES CORPORATION, Armonk, NY (US)

(72) Inventors: Jason A. Nickolai, Rochester, MN (US); Jon C. Rossow, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 16/818,541

(22) Filed: Mar. 13, 2020

(65) Prior Publication Data

US 2021/0288960 A1   Sep. 16, 2021

(51) Int. Cl.
*H04L 9/40* (2022.01)
*H04L 41/16* (2022.01)

(52) U.S. Cl.
CPC .......... *H04L 63/0884* (2013.01); *H04L 41/16* (2013.01); *H04L 63/083* (2013.01); *H04L 63/0815* (2013.01); *H04L 63/107* (2013.01); *H04L 63/1491* (2013.01); *H04L 63/0869* (2013.01)

(58) Field of Classification Search
CPC . H04L 63/0884; H04L 63/107; H04L 63/083; H04L 41/16; H04L 63/1491; H04L 63/0869; H04L 63/0815; H04L 41/046; H04L 43/0852
See application file for complete search history.

(56) References Cited

U.S. PATENT DOCUMENTS

| 7,610,396 | B2 |   | 10/2009 | Taglienti et al. |
| 7,673,062 | B2 |   | 3/2010 | Lord et al. |
| 8,489,635 | B1 | * | 7/2013 | Phoha .................. G06F 21/316 713/184 |

(Continued)

OTHER PUBLICATIONS

P. Sarker, et al; "Internet Protocal Storage Area Networks"; IBM Systems Journal 42.2 (2003): 218-231.

(Continued)

*Primary Examiner* — Huan V Doan
(74) *Attorney, Agent, or Firm* — Gregory M. Nordstrom

(57) ABSTRACT

A method comprises an authentication agent receiving a communications protocol message from a login agent of a client attempting to login to a target system. The authentication agent determines a login metric associated with the protocol message. The login metric comprises a latency, network, and/or data entry metric. The authentication agent receives credentials associated with an authentic client of the target system and compares the login metric with a registered metric associated with the authentic client. Based on the login metric comporting with the registered metric, the authentication agent continues login processing or performs a non-comporting metric action. Another method comprises the authentication agent sending a training request to the login agent, receiving a training response, determining a login metric associated with the training response, and recording the login metric among registered metrics of an authentic client. A computing system can implement the methods.

20 Claims, 6 Drawing Sheets

(56) References Cited

U.S. PATENT DOCUMENTS

| | | | |
|---|---|---|---|
| 8,863,258 B2* | 10/2014 | Goldberg | G06F 21/316 |
| | | | 726/7 |
| 2005/0138179 A1 | 6/2005 | Encarnacion et al. | |
| 2012/0216265 A1* | 8/2012 | Mansour | G06Q 20/40 |
| | | | 726/7 |
| 2013/0036458 A1* | 2/2013 | Liberman | H04L 63/0861 |
| | | | 726/5 |
| 2017/0171173 A1* | 6/2017 | Chandrasekaran | |
| | | | H04L 63/0884 |
| 2018/0007087 A1* | 1/2018 | Grady | G06F 21/554 |

OTHER PUBLICATIONS

H. Johnson, "Toward adjustable lightweight authentication for network access control". Doctoral Dissertation Series No. 2005:09. Blekinge Institute of Technology, Dec. 2005.

Walsh et al., "Mechanisms for Mutual Attested Microservice Communication." UCC Companion'17, Dec. 5-8, 2017, Austin, Texas, USA. Companion Proceedings of the10th International Conference on Utility and Cloud Computing. ACM, 2017.

Wardana et al., "Access Control on Internet of Things based on Publish/Subscribe using Authentication Server and Secure Protocol." 2018 10th International Conference on Information Technology and Electrical Engineering (ICITEE).

\* cited by examiner

AUTHENTICATION USING CLIENT LOGIN METRICS

BACKGROUND

The present disclosure relates to authenticating a client to access to a computing system, and/or resources of a computing system. More specifically, the present disclosure relates to authenticating a client during client login operations of a target computing system.

SUMMARY

The present disclosure (hereinafter, "the disclosure") relates to authenticating a client of a target computing system (hereinafter, "target system"). According to embodiments of the disclosure (hereinafter, "embodiments"), a computer-implemented method comprises an authentication agent receiving, from a login agent, a protocol message associated with a login operation to a target computing system. In response the authentication agent determines a login metric associated with the protocol message. The authentication agent also receives, from the login agent, credentials corresponding to an authentic client of the target system and, based on the credentials, retrieves registered login metrics associated with the authentic client. The authentication agent compares the login metric to a registered login metric among the registered login metrics of the authentic client, and determines a comporting status of the login metric. The authentication agent takes a metrics-based authentication action. The metrics-based authentication action is based on the comporting status. In embodiments, the protocol message can comprise a security action response and the login metric can be associated with the security action response. The login metrics can include a protocol count, a network node list, a network count, and/or client data entry metric, The client data entry metric can be a data entry pattern of the login client a time period between keystrokes of the login client typographical mistakes of the login client and/or a latency for the login client to complete entering data for input to an authentication agent.

In embodiments, the comporting status can comprise that the login metric comports with the registered login metric and, based on that status, can perform a metrics-based login action that includes completing login processing. Alternatively, in embodiments, the comporting status can comprise that the login metric does not comport with the registered login metric and, based on that status, can perform a metrics-based login action that includes a non-comporting metrics action. In embodiments, the non-comporting actions can include terminating a connection between the login agent and the target system; preventing a subsequent login to the target system using the credentials; communicating to an administrator of the target system information regarding that the second login metrics do not comport with the registered login metrics; auditing a connection between the login agent and the target system; logging information regarding a connection between the login agent and the target system; permitting the login agent to repeat the login request to login to the target system; and/or connecting the login agent to a "honey pot" system.

A computing system can embody methods of the disclosure. The computing system can comprise a target computing system, registered login metrics of an authentic client of the target system, a login agent, and a computer-implemented authentication agent. The authentication agent can perform methods and/or operations of the disclosure.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure (hereinafter, "the disclosure) and, along with the description, serve to explain the principles of the disclosure. The drawings are only illustrative of certain embodiments and do not limit the disclosure.

Figure 1:
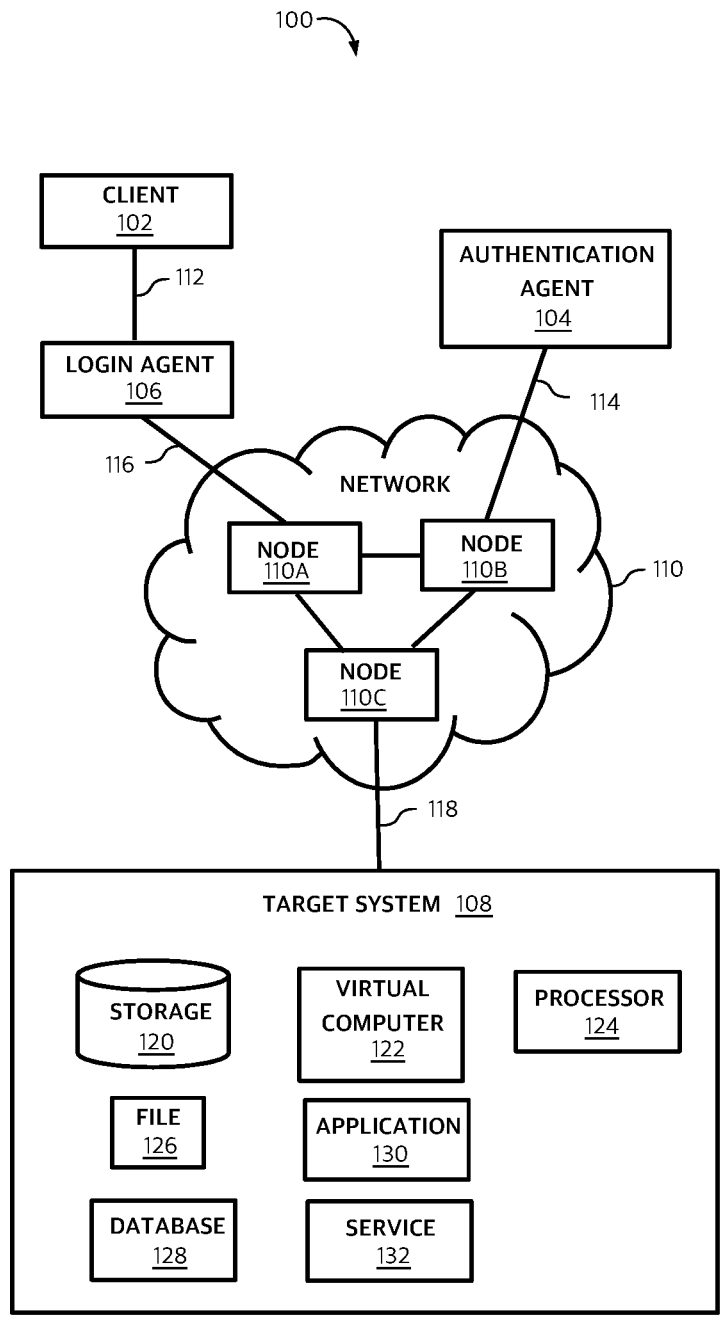
FIG. 1 illustrates an example computing system, according to aspects of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure.

DETAILED DESCRIPTION

Aspects of the present disclosure (hereinafter, "the disclosure") relate to authenticating access to a computing system, and/or resources of a computing system. More particular aspects relate to authentication of a client of a target system, and/or client credentials, during a login operation associated with the target system. While the disclosure is not necessarily limited to such applications, various aspects of the disclosure may be appreciated through a discussion of various examples using this context.

In embodiments of the disclosure (hereinafter, "embodiments"), a computing system can comprise a computing device, or combination of computing devices, applications of a computing device, and/or resources of a computing device. Such computing systems can comprise, for example, standalone computers, networked computers, client/server systems, and/or virtual computing systems. Computing devices, included in such computing systems, can comprise, for example, workstation computers, server computers, mobile computing devices (e.g., tablet devices, mobile phones, and/or computing devices of a vehicle), computing devices of vehicles or appliances, and/or wearable computing devices (e.g, virtual reality devices, and/or "smart" watches).

A client of a "target" computing system (hereinafter, "target system) can be authorized to access and/or utilize resources of the target system. A client of a target system can be, for example, a human user and/or an automated client, such as a computing device or system, and/or an application of a computing device or system. Accordingly, as used herein, "application" refers to an application and/or function (hardware and/or software) of a computing device, and "client" refers to any human user, computing device, or application (individually, or in combination) that can request access to resources of a computing system, and "target system" refers to a computing system, and/or resources of a computing system, that a client can access, or attempt to access.

Resources of a target system accessed by a client can include, for example, processors, memory and/or storage, communications networks or components thereof, files and/or databases, applications, and/or services of, and/or managed by, the target system. The resources can be physical or can be virtualized and/or cloud computing resources). For example, such resources can include physical and/or virtual processors, memory, and/or storage subsystems and/or devices, and physical and/or virtual network and/or Internet resources, applications and/or services of a cloud computing system, and so forth.

A target system, and/or a computing system that manages access to a target system (hereinafter, "access control system", or "ACS"), can restrict access to, and/or associate particular access permissions in the use of those resources with an "authentic client". As used herein, "login client" refers to any client (and/or device or agent of a client) attempting to access a target system through a login process, and an "authentic client" refers to a client that is known to, and/or authorized by, the target system, and/or an ACS managing access to the target system, to access a computing system and/or resources thereof. Accordingly, to access resources of the target system, a login client can perform a "login process" with the target system and/or ACS that can authenticate the client as an authentic client of the target system. "Authenticate" refers, herein, to any process that can, in whole or in part, determine that a client attempting to access a target system is (or, likely is) an authentic client of the target system.

A login process can engage an "authentication agent" to authenticate a login client. As used herein, "authentication agent" refers to a computing system, or component of a computing system (e.g., a device such as a biometric device or an application program), that can perform operations to authenticate a client attempting to access resources of a target system. In embodiments, such an authentication agent can be a component of a target system, can be a component of an ACS, and/or a combination of these (e.g., an authentication agent having components distributed between a target system and an ACS.).

An authentication agent can authenticate a login client to a target system using, for example, "client credentials". The login process can include the login client providing client credentials to the authentication agent, which the agent can then verify as associated with a known client of the target system, as well as (optionally) particular permissions associated with the client's use of those resources. Such client credentials can comprise a variety of forms of information uniquely identifying a client. For example, client credentials can include a user identifier (UID) associated with a client, and, optionally, a password associated with a particular UID. A human client can have biometric data uniquely identifying that user. A computing device, and/or application, can have, for example, a device identifier, such as a serial number or "World-Wide Unique Identifier" (WWUID); or a Media Access Control (MAC) identifier and/or Internet Protocol (IP) address in a network.

Clients can initiate a login using a "login agent" to connect to an authentication agent and perform a login process. In embodiments, a login agent can be, for example, a computing system, a mobile device, a virtual computer, a special purpose device, and/or or a software application. As used herein, "login agent" refers to any combination of hardware and/or software that can connect a login client to an authentication agent and that can perform, or enable the client to perform, a login process to access a target system. A login process can comprise a client connecting (e.g., by means of a communications interface) the login agent to a login function of an authentication agent, the authentication agent requesting the client to enter client credentials—such as a UID and password—and the authentication agent then verifying the identity of the client based on the entered credentials.

To illustrate, FIG. 1 depicts an example embodiment of a computing system comprising a login client, a target system, and an authentication agent. In FIG. 1, computing system 100 comprises target system 108, authentication agent 104 (for brevity, hereinafter, "agent 104"), client 102, and login agent 106. Target system 108 includes resources comprising storage 120, virtual computer 122, processor 124, file 126, database 128, application 130, and service 132. Any or all of such resources can be resources of target system 108 that client 102 can access or utilize as an authentic client of target system 108, and can be physical or virtual resources, or a combination thereof. In embodiments, target system 108 can be any kind of computing system having resources of utility to a client, whether the client is human, a computing system or application, or a combination of human client and computing system or application. For example, a target system, such as 108, can be a database server, network server, a virtualization server, a cloud computing system, or a component of these.

Client 102 interfaces to login agent 106 by means of interface 112. In embodiments, interface 112 can be, for example, a keyboard, an audio interface, a gesture interface, a software interface, a communications interface, and/or a combination of these. A client, such as 102, can be included in a login agent, such as an application of a login agent, and/or an interface, such as 112, can be a software interface (e.g., a graphical or command user interface, an application interface, and/or a hardware interface). However, this is not intended to limit embodiments and it would be apparent to one of ordinary skill in the art that, in embodiments, an interface between a client and a login agent can be any form of electronic, software, and/or computing interfaces suitable for a client to interact with a client device for purposes of accessing a target system.

Login agent 106, target system 108, and agent 104 interconnect through network 110. To access target system 108, and/or resources of target system 108 (e.g., storage 120 or virtual computer 126), client 102 can initiate, or request, a login process with authentication agent by means of login agent 106 communicating through network 110 with authentication agent 104 to perform a login process. To initiate, or request, a login process, login agent 106 can, for example, request that agent 104 establish a communications connection (e.g., an IP; Secure Shell, or, "SSH"; and/or Transaction Control Protocol, or "TCP", connection) with login agent 106 through network 110.

FIG. 1 depicts network 110 comprising nodes 110A, 110B, and 110C (hereinafter, "nodes 110") connected, respectively, to login agent 106, agent 104, and target system 108 using respective network interfaces 116, 114, and 118. Nodes 110 can be nodes of a network such as previously described, and can be interconnected within network 110, as depicted in FIG. 1. As used herein "connect", in regard to an interconnection or interface between two or more components or elements of an embodiment, refers to any form of communicative coupling, not limited to, for example, a physical connection. Rather, in embodiments, to components or elements can "connect", or "be connected" by means of physical interfaces, logical interface, virtual interfaces, communications interfaces, and/or software interfaces (e.g., an application programming or command line interface). For purposes of illustrating the disclosure, but not intended to limit embodiments, as used herein references to an authentication agent, in the context of a communications interface interconnecting an authentication agent and a login agent, incorporate a node that includes the agent, and/or couples the agent to the communications interface. Similarly, as used herein, references to a "login agent", in the context of a communications interface interconnecting a login agent and an authentication agent, incorporate a node that includes the login agent, and/or couples the login agent to the communications interface.

While FIG. 1 illustrates the example of computing system 100 having agent 104 and login agent 106 communicate by means of network 110, this is only to illustrate the disclosure and not intended to limit embodiments. It would be apparent to one of ordinary skill in the art that agent 104 can be included in, or can include, any of the computing and/or network elements depicted in FIG. 1 (e.g., network 110 or a node among nodes 110, target system 108, and/or components or resources of target system 108), or can itself comprise, or be included in, a computing system (not shown in FIG. 1) connected to login agent 106. Agent 104 can be included in an ACS (not shown in FIG. 1). It would also be apparent to one of ordinary skill in the art that agent 104 need not be coupled to target system 108. For example, agent 104 can operate solely to authenticate clients of target system 108, without necessarily interacting otherwise with target system 108. It would also be apparent to one of ordinary skill in the art that login agent 106, agent 104, and target system 108 need not interconnect by means of the same communications interface, such as network 110, and that a communications interface need not be a network (e.g., can be point-to-point interfaces or software stacks of a computing system).

A login process can further include multi-factor authentication of a client. Multi-factor authentication can include, for example, an authentication code sent (e.g., as part of a login process) from an authentication agent to a "second factor agent". A second factor agent can be a particular computing device and/or application, for example, associated with an authentic client. In embodiments, a second factor agent can be, but is not necessarily, separate from a login agent the client uses to initiate a login process. For example, a second factor agent can be an email or text messaging account, which can be accessed by a client and/or a login agent during a login process, or can be a mobile device (or, mobile device application) associated particularly with an authentic client. As part of the login process, the authentication agent can generate, and communicate to the second factor agent, an authentication code. In response, the login client can receive the code, by means of the second factor agent, and communicate the code (e.g., by means of the login agent) to the authentication agent to continue, or complete, the login process. For brevity of the disclosure, but not intended to limit embodiments, "login agent" will be understood from the context of its use in the description of the disclosure, to encompass either or both of a login agent, as previously described, and a second factor agent.

Figure 2:
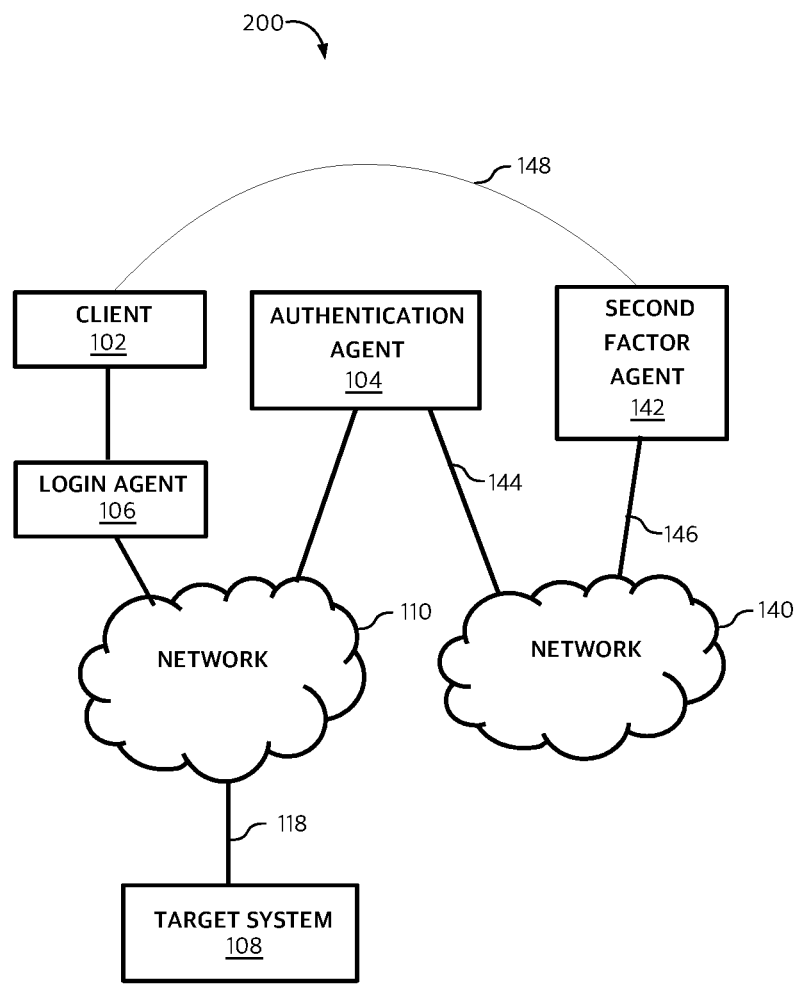
FIG. 2 illustrates an alternative computing system, according to aspects of the disclosure.

FIG. 2 illustrates an example embodiment of a computing system that includes a second factor agent. FIG. 2 depicts example computing system 200 comprising computing system 100, of FIG. 1, and second factor agent 142 (hereinafter, "agent 142"). FIG. 2 depicts computing system 200 comprising client 102, agent 104, login agent 106, target system 108—of example system 100 of FIG. 1—and agent 142 interconnected by network 110 of FIG. 1. FIG. 2 further depicts computing system 200 including second factor agent 142 connected to network 140 by means of network interface 146, agent 104 connected to network 140 by means of network interface 144, and agent 142 connected to client 102 by means of interface 148. In embodiments, agent 142 can be a second factor agent associated with (e.g., used by) client 102 which can participate in a login process involving client 102, such as previously described.

In embodiments, interface 148 can be any form of computing and/or communications interface permitting client 102 and agent 142 to interact, such as for client 102 to obtain an authentication code from agent 142. Further while FIG. 2 depicts interface 148 connecting to client 102, this is not intended to limit embodiments. It would be understood by one of ordinary skill in the art that agent 142 can alternatively, or additionally, connect to login agent 106 and/or network 110, that agent 104 can connect to agent 142 by means other than network 144, and/or that network 110 and 140 can be part of the same network or can be two networks (as depicted in FIG. 2), and that the two networks can be connected to each other (not shown in FIG. 2).

Similar to the operation of example computing system 100 as described with reference to FIG. 1, in computing system 200 of FIG. 2, client 102, using login agent 106, can communicate (via network 110) to agent 104 a request to initiate (or, perform) a login process to access resources of target system 108. In performing the login process, agent 104 can communicate (via network 110) a request for client credentials to login agent 106 and client 102. Additionally, agent 104 can communicate to agent 142 (via network 140, for example) an authentication code. Client 102 can (e.g., by means of interface 148) request from, or otherwise access, the authentication code received by agent 142 from agent 104. Client 102 can then communicate the authentication code to agent 104 as part of the login process, for agent 104 for further authenticate client 102 as an authentic client of target system 108. Hereinafter, except where explicitly described otherwise, "login agent" encompasses any device or application, or combination thereof, used by a client to perform a login process, or protocol thereof, with an authentication agent, including a login agent such as previously described and a second factor agent.

Additional layers of authentication, such as multi-factor authentication, can improve over, for example, basic UID and password combinations to authenticate a client attempting to access a target system. In embodiments, a "Metrics-Augmented" Authentication agent (hereinafter, "MAA") can utilize "login metrics" associated with protocol messages to improve authentication of a login client. As used herein, "protocol message" refers to any message sent and/or received by a login agent and/or authentication agent to perform a network connection and/or communications protocol, such as a Media Access (MAC), SSH, IP, and/or TCP protocol of a communications interface or network. In embodiments, login metrics can comprise, for example, latency metrics, network metrics, and/or data entry metrics associated with protocol messages exchanged between an MAA agent and a login client and/or a login agent. However, this is not intended to limit embodiments and it would be apparent to one of ordinary skill in the art that, in embodiments, "login metrics" can comprise any metric (e.g., a latency or data in a protocol message) that can identify, or indicate, a locality (geographic and/or within a communications system or network) of a login agent of a login client.

An MAA agent can determine (e.g., measure or observe) such metrics during a login (and/or alternative authentication) process and compare these metrics to metrics known to be associated with a particular authentic client, and/or login agent of an authentic client, of a target system. In embodiments, a "metrics-augmented" computing system (hereinafter, "MA system") can use an MAA agent to improve authentication of a login client. As used herein, "MA system" refers to any form of computing system that includes an MAA agent. In embodiments, an MAA agent can be a component of, and/or communicatively coupled to, a computing system, such as example systems 100 in FIGS. 1 and 200 in FIG. 2. For example, in FIGS. 1 and 2, agent 104 can comprise an MAA agent; an MAA agent can be a component of a network node, such as node 110B in FIG. 1; a component of a target system, such as 108 in FIGS. 1 and 2; and/or an ACS (not shown in FIGS. 1 and 2) managing a target system such as 108. Accordingly, respective computing systems 100 and/or 200 can comprise MA systems.

Communications latencies (e.g., a period of time to perform a network or login protocol operations, such as to receive a response to a network connection or login protocol message) can correspond to a particular geographic and/or network distance between a login agent, used to access a target system, and an MAA agent. A geographic and/or network "distance" between a login agent and an MAA agent refers, respectively, herein to a distance between geographic locations of the login agent and MAA agent, and between "network locations" of the login agent and MAA agent.

As used herein, "geographic location" refers to a geographic location of a computing system and/or device that includes a login or MAA agent, and/or communicatively couples a login agent and an MAA agent. A geographic location can be a location on the earth, or can be an astronomical location, such as a location within a geosynchronous orbit around the earth (e.g., a location of a satellite). Similarly, as used herein, "network location" refers to a location of a particular network node (hereinafter, "node"), within a communications network connecting a login agent and an MAA agent. In embodiments, a node can comprise, for example, a network router or gateway; a computing device or system; a cellular phone tower, or component thereof; a communications satellite, or component thereof; a software element of a network, such as an IP, SSH, or TCP client; or, virtualized computing system or device, such as a virtual computer, virtual server, or virtual network router or gateway.

A latency metric can correspond to a geographic distance between a login agent and an MAA agent. For example, a particular geographic distance between a login and MAA agent can correspond to a particular latency (or, range of latencies) to perform a particular network (e.g., an IP, SSH, or TCP connection protocol), or a particular login protocol (e.g., exchanges, and/or exchange a second factor authentication code). A different geographic distance between a login and MAA agent can correspond to a different latency (or, range of latencies) to perform the network or login protocol. Accordingly, such differences can indicate a client requesting to login to a target system from differing geographic locations.

To illustrate further, using the example of FIG. 1 a geographic distance between login agent 106 and agent 104 can comprise a geographic distance between geographic locations of nodes 110A and 110B, between geographic locations of login agent 106 and node 110A, between geographic locations of agent 104 and node 110B, and/or between geographic locations of nodes of network 110 (e.g., between 110A and 110B, 110A and 110C, and/or 110B and 110C). A latency to perform an IP ping, for example, between login agent 106 and agent 104, when login agent 106 is connected, as shown, to node 110A (located at one particular geographic location) can differ from a latency to perform an IP ping between login agent 106 and agent 104, when login agent 106 is instead connected, for example, to node 110C (located at a different geographic location).

Similarly, a latency metric can correspond to a network distance between a login agent and an MAA agent. For example, a login agent and an MAA agent can connect through a network by a particular route (or, path) comprising particular nodes of the network. Using again the example of FIG. 1, login agent 106 can communicate with agent 104 via a route comprising a direct connection between node 110A and node 110B. Alternatively, login agent 106 can communicate with agent 104 by an indirect route passing between nodes 110A and 110B through 110C. Communications (e.g., network and/or login protocol communications) between login agent 106 and agent 104 can have differing latencies based on which path (direct or indirect, in FIG. 1) the communications take. Accordingly, such differences can indicate a client attempt to login from differing network locations, and the different network locations can indicate a login client attempting to login using differing login agents, and/or login agents located at differing geographic locations.

While not illustrated in the examples of FIGS. 1 and 2, a login agent, and/or nodes of a network, can include a software structure (e.g., a "software stack", or "protocol stack") that performs some or all of a network or login protocol. For example, a laptop computer, can have a particular software stack to implement the network and/or login protocols of a login agent, and a mobile device (e.g., a tablet computer or mobile phone) can have a different software stack to implement the network and/or login protocols of a login agent. A virtual computer can have a different software stack to implement network and/or login protocols of a login agent than that of a physical computer or device (e.g., a laptop or mobile device). Similarly, different network nodes can implement different software stacks to implement network protocols. Each of these software stacks can contribute a particular execution time to a network and/or protocol (e.g., communications connection and/or login protocol message) latency. Such differences can indicate a client attempt to login from differing login agents (e.g., a mobile device instead of laptop computer) and/or differing network locations.

A network metric, in embodiments, can comprise a metric indicating a network distance between a login and an MAA agent. For example, a network metric can comprise a list (e.g., included in network protocol packet) of nodes, and/or a count of nodes—such as an IP "Time to Live (TTL) or, alternatively, "hop" count—that have received and/or forwarded such communications. Correspondingly, differing network metrics associated with network and/or login protocols or communications can indicate a login agent attempting to login from differing network locations.

As previously described, in embodiments login metrics can additionally, or alternatively, comprise "data entry metrics". Such data entry metrics can comprise, for example, data entry patterns, such as typical time between keystrokes of a human client entering credential information, and/or common typographical mistakes of an authentic human user, such as backspaces or password or security answer errors. Data entry metrics can include latency to complete entering data, such as a time typical of a human user to complete entering a credential, and/or time for an application to complete entering a credential.

In embodiments an MAA agent can determine login metrics—such as measure latency and/or data entry metrics, and/or inspect values of a network metric—associated with a client attempting to login with a target system and compare these to "registered" login metrics. In embodiments, registered login metrics (hereinafter, for brevity, "registered metrics") can comprise login metrics (e.g., particular values of metrics, and/or ranges of values of metrics) known (e.g., previously determined) in association with an authentic client. Based on a comparison between login metrics determined during a login process, and registered metrics of an authentic client, an MAA agent can determine that a client attempting a login using the authentic client's credentials is (or, likely is) the authentic client. Alternatively, or additionally, an MAA agent can determine that a client attempting a login using the authentic client's credentials is a "potentially fraudulent client". A "potentially fraudulent" client refers herein to a client that attempts a login to a target system, using credentials of an authentic client of that system, that may not actually be that authentic client (e.g., may be a client that is not itself authenticated to access the system but has obtained credentials of a client that is authenticated for that system).

In embodiments, an MA system can determine registered metrics of an authentic client, for example, when authorizing that client to access a target system, and/or can determine or modify these during subsequent login processes with the client. An MA system can, for example, create (or, access) a client profile (e.g., comprising data about the client) and can record the login metrics in the profile or, alternatively, in association with the profile (thereby associating the metrics with the particular client). An MA system can have login metrics associated with geographic and/or network locations of one or more login agents that a client normally, or frequently, uses (or, is permitted to use) to access a target system, and the MA system can associate these metrics with an authentic client as registered metrics of that client.

For example, a client may use, or be permitted to use, a login agent located within a particular physical premise. An MA system can determine latency and/or network metrics associated with the premise, and these may not vary outside of a particular range of values. Similarly, a client may use, or be permitted to use, a login agent connected to, or using, particular network locations, such as nodes and/or types of nodes (e.g., nodes of cabled versus wireless networks, open versus private networks, or physical versus virtual or cloud computers), and latency and/or network metrics, associated with those network locations may be known to the MA system, and these may not vary outside of a particular range of values. The MA system can associate these metrics with authentic clients as registered metrics of the clients.

Figure 3:
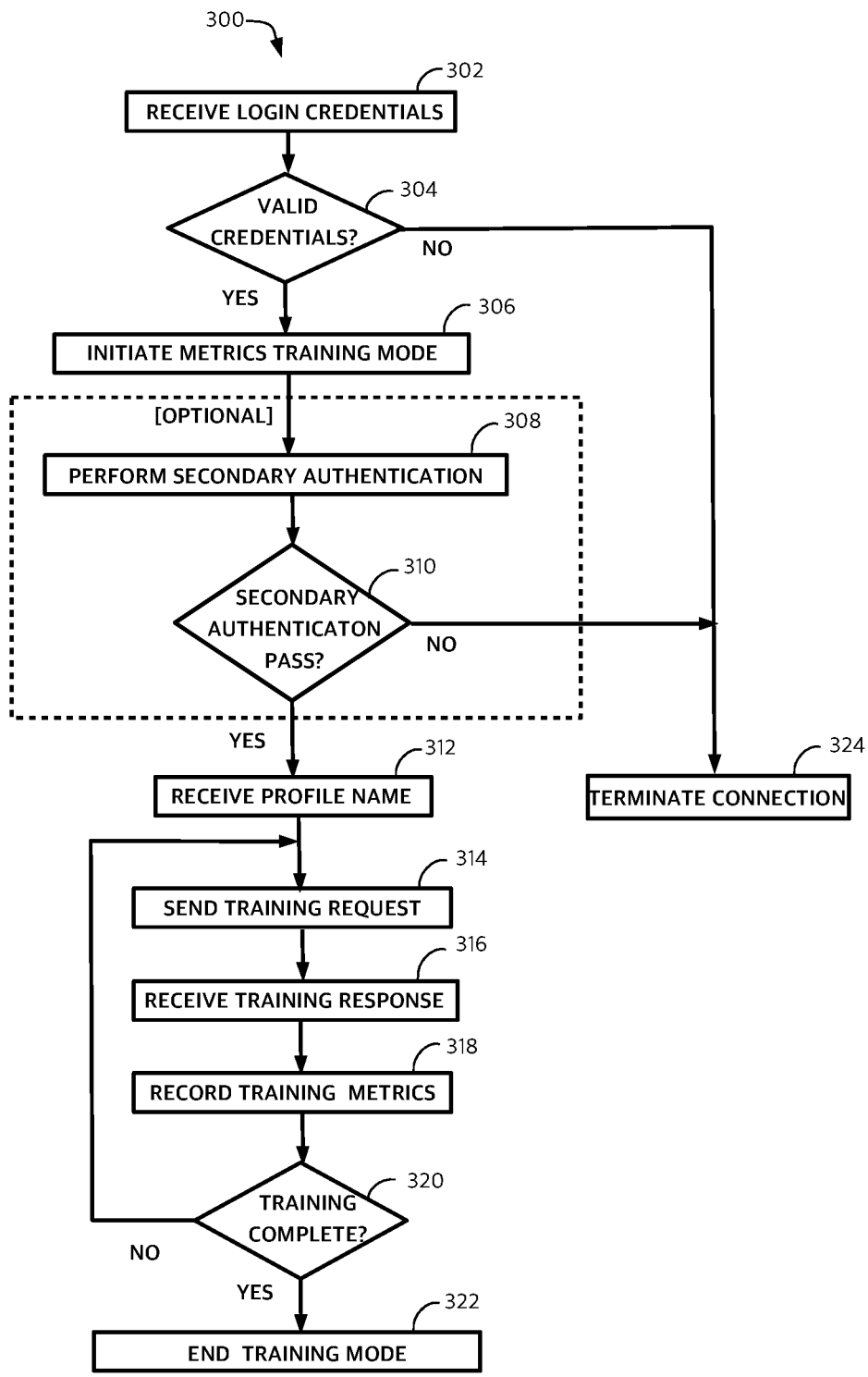
FIG. 3 illustrates an example login metrics training method, according to aspects of the disclosure.

To determine registered metrics, an MA system can perform an MAA training method. FIG. 3 illustrates example MAA training method 300 to determine such metrics in association with a particular client. For purposes of illustrating the example MAA training method, but not intended to limit embodiments, example method 300 is described as performed by an MAA agent of an MA system interacting with a "subject client". In embodiments, such a subject client can be either an authentic client (i.e., authorized to access a target system), can be a client the MA system is authenticating for future access to a target system, or can be potentially fraudulent client.

In FIG. 3, at step 302 of method 300 the MAA agent receives credentials from the subject client. In embodiments, the MAA agent can receive the credentials as part of initially registering the client as an authorized user (e.g., as part the MA system initially registering the client for access to a target system), or can receive them as part of a login session with the subject client. A "login session", as used herein, refers to an interaction of a client and MA system, including but not limited to login communications (e.g., communications and/or login connection and/or protocol messages) between the client and system, for the client to access a target system.

At step 304, the MAA agent determines if the credentials received in step 302 are valid as belonging to an authentic client of the MA system. If not, at 324 the MAA agent terminates the connection to the client (e.g., terminates a network protocol connection and/or the login session). If, alternatively, at 304 the MAA agent determines the credentials are valid, at 306 the MAA agent initiates a "metrics training mode", to perform metrics training.

In embodiments, initiating the metrics training mode can comprise enabling the subject client, login agent, and/or MAA agent to perform particular MAA training operations. For example, initiating the metrics training mode can include activating a particular application or program of a login agent of the subject client, and/or MAA agent, to perform MAA training operations. Additionally, or alternatively, initiating metrics training mode can include the subject client (e.g., the subject client login agent) activating a training program that requests the MAA agent to perform metrics training. Such a training program can initiate communications with the MAA agent specific to the agent measuring and recording login metrics. Such communications can be encrypted to prevent an unauthenticated client from eavesdropping on the communications and/or capturing the authentic client's login metrics. However, in embodiments, metric training (such as example method 300), and/or initiating metric training, can be advantageously performed such that the subject client (and/or subject client login agent) are unaware that training is occurring, so as to prevent the client manipulating the metrics (e.g., manipulating response times).

In some embodiments, initiating the metrics training mode, at step 306, can include, for example, the MAA agent starting a timer, which can limit the amount of time for which the MAA agent measures or observes login metrics with the subject client. In another example, to limit the duration or operations of metrics training mode the MAA agent can count a number of login (and/or alternative authentication) sessions to collect login metrics, and/or can count particular metrics to collect. Metrics training mode, in embodiments, can simulate multiple login sessions and/or protocol (e.g., IP and/or SSH) communications, such as to perform steps 306-318 repetitively for a number of iterations, to collect a range of variations in the login metrics associated with a particular client.

At step 308, the MAA agent, optionally, performs a secondary authentication process with the subject client. In embodiments, performing a secondary authentication process can comprise, for example, performing a two-factor authentication, such as previously described, or receiving from the subject client, additional authentication information, such as biometric data, answers to pre-determined security questions, and/or a pre-determined, or pre-authorized, security key.

If the MAA agent performs optional step 308, at step 310 the MAA agent determines if the subject client passes the secondary authentication process. If the MAA agent determines, at 310 that the client did not pass, at 324 the MAA agent terminates the connection with the subject client, as previously described in reference to step 304. If, at 310, the MAA agent alternatively determines that the subject client passed the secondary authentication process or, if the MAA agent did not perform step 308, at step 312 the MAA agent receives a profile name associated with, or to associate with, the subject client. In embodiments, at 312 the MAA agent can receive the profile name from the subject client or, alternatively, can receive the profile name from another component of the MA system. For example, at 312 the MAA can request a profile name from an ACS that maintains a list of authentic clients and associated profiles.

At steps 314-318, the MAA agent performs metrics training operations with the subject client. At 314, the MAA sends a training request to the subject client. In embodiments, at 314 an MAA can, for example, send a network protocol message (e.g., an IP, SSH, and/or TCP protocol message) to a login agent of the subject client. In another example, at 314 an MAA can send a login, authentication, or specialized metrics training message to the subject client. At 316, the MAA agents receives from the login agent a training response to the training request sent in step 314. For example, at 316 the MAA agent can receive an IP, SSH, and/or TCP message, and/or a login, authentication, or metrics training message, in response to a training request sent at 314.

At 318, the MAA agent determines one more login metrics associated with the request and response communicated at steps 314 and 316. In embodiments, the metric can be a latency metric, network metric, and/or a data entry metric. For example, at step 314 the MAA agent can start a timer in conjunction with sending the training request and can measure the time until the MAA agent has received, at 316, the training response. To determine a network metric, the MAA agent can inspect a hop count received in a protocol message (or, packet) that includes the training response. In some embodiments, to determine a data entry metric an MAA agent can detect time between keystrokes of a keyboard for a subject client to enter data into a training response. An MAA agent can receive individual keystrokes of client entry of response message data and can, thereby, detect patterns and/or timing of keystrokes entered by a subject client, in responding to a training request, to determine a data entry metric.

Having, at 304 and/or 310, determined the subject client is an authentic client of the target system, at 318, the MAA agent records the metrics determined from steps 314 and 316 as registered metrics of the authentic client. In embodiments, the MAA agent can, for example, record the metrics in a database of authentic clients and/or the profile received at step 312. Alternatively, the MAA agent can communicate the metrics to another component of the MA system (e.g., a registration agent or ACS of the MA system) to record in association with the authentic client.

At step 320, the MAA agent determines if the MAA training session is complete. In embodiments, an MAA agent can determine that MAA training is complete based on a timer (e.g., started at step 306) that has expired. Alternatively, or additionally, an MAA agent can determine that MAA training is complete based on having recorded a particular set of metrics, such as a set of metrics that determines a statistical range of values of the metrics.

If, at 320, the MAA agent determines that MAA training is not complete, the MAA agent can repeat steps 314-318. If, on the other hand, at 320 the MAA agent determines that MAA training is complete, at 322 the MAA agent ends the training mode. In embodiments, at 320 ending the training mode can include the MAA agent communicating to the subject client that it has completed the training session. In response, the subject client can end an MAA training application or program activated at step 306. Ending training mode, at 320, can include terminating a login session, disconnecting the subject client from the MAA agent and/or MA system, or continuing the login process.

In embodiments, an MA system can perform such an MAA training method, or steps or operations thereof, a single time, or can perform the method or, operations of the method, during one or more subsequent login or training sessions with a subject client. An MAA agent can include the results (e.g., additional metrics determined from such repetitions) among registered metrics of the subject client. Repeating such metrics collection can improve the accuracy and/or range of the registered metrics, and correspondingly improve the accuracy of authenticating a client attempting a login with the MA system.

Figure 4A:
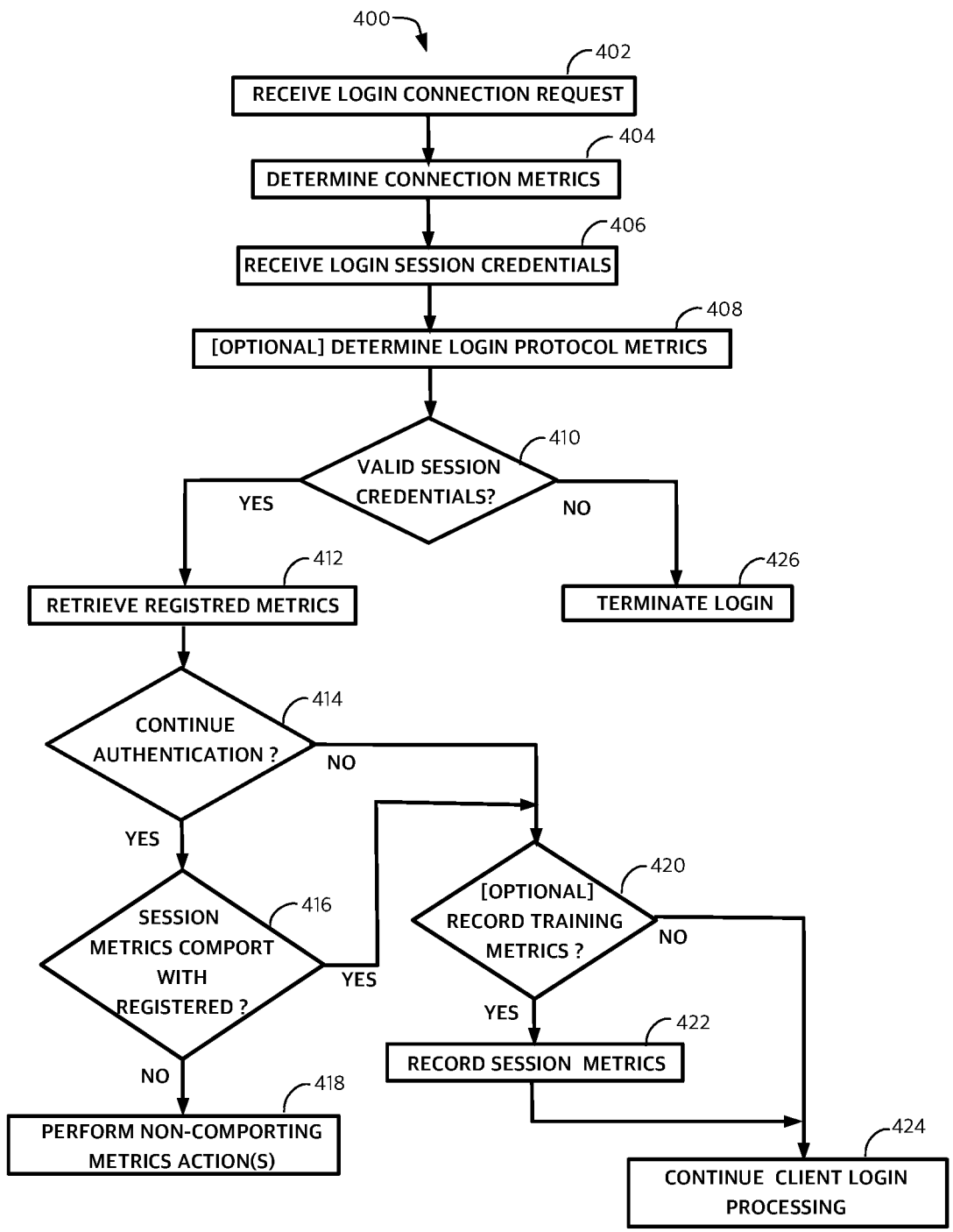
FIG. 4A illustrates an example method utilizing login metrics to authenticate a login client, according to aspects of the disclosure.

As previously described, to improve the authentication process of an MA system, the MA system (e.g., an MAA agent of an MA system) can determine login metrics during a login session with a client and can compare these metrics to registered metrics associated with that client, such as registered metrics determined by a method such as example method 300 of FIG. 3. FIG. 4 illustrates example login method 400 that embodiments of an MAA agent, or component thereof, can perform to authenticate a login client, and/or detect a potentially fraudulent client, utilizing login metrics associated with communications (e.g., IP, SSH, and/or TCP connections) and/or login protocols.

Example method 400 illustrates an example method by which embodiments can determine login metrics associated with protocol messages (e.g., request and response messages to establish a communications connection, and/or perform login operations), and utilize these login metrics to authenticate a login client. For purposes of illustrating the disclosure, but not intended to limit embodiments, example method 400 is described as performed by an MAA agent of an MA system interacting with a login client to access a target system. It will be understood, in the description of FIG. 4A, except where otherwise explicitly noted, interactions with the "login client" implicitly include interactions with a login agent of the login client.

At step 402 of method 400, the MAA agent processes a request from the login client to connect to a target system. For example, the MAA agent can receive from the login client, at 402, a request to connect to the target system, and/or to connect to the MAA agent. Such a request can include establishing a communications protocol connection (e.g., IP, SSH, or TCP) between the login agent to the target system and/or MAA agent. In embodiments, the MAA agent can determine login metrics associated with the login request, such as latency, protocol, and/or data entry metrics associated with the communications connections. Accordingly, at step 404, the MAA determines login metrics (e.g., latency, protocol, and/or data entry metrics, such as previously described) associated with establishing the requested connection.

In embodiments, at step 404 the MAA agent can, for example, communicate to a login agent of the login client a connection initiation message (or, packet) and receive, from the login agent, and a connection response message (or, packet) and the MAA agent can measure the latency of the response message (e.g., the time from communicating the connection initiation message to receiving the response message), and/or can inspect a protocol counter (e.g., a hop count) associated with the response. A response message can include the client and/or login agent entering data (e.g., entry of connection parameters) for a response message, and the MAA agent can measure latency (time to complete) of the data entry, and/or. determine data entry patterns (e.g., keystrokes or data patterns associated with the login client or login agent entering response message data).

At step 406, the MAA agent receives "session credentials"; that is, credentials (e.g., a user ID and password, and/or biometric data) received by the MAA agent from the login client. In embodiments, the MAA agent can communicate a request to the login client for the credentials and receive the credentials as a response to the request. The MAA agent and login agent can utilize, for example, a communications protocol connection established at step 402 to communicate the request and credentials. In an embodiment, at 406 the MAA agent can measure login metrics associated with requesting and/or receiving the session credentials, and can include these in the session metrics.

At optional step 408, the MAA can determine login metrics associated with the login protocol communications. In embodiments, an MAA agent can perform step 408 to determine additional login metrics to more accurately authenticate a login client. Similar to step 404, determining login metrics, at 408, can comprise, for example, the MAA agent measuring latency of a response to a communications and/or a login protocol message, inspecting a protocol counter associated with a response to communications and/or a login protocol message, measuring latency of data entry by the client, and/or monitoring data entry patterns.

At step 410, the MAA agent determines if the session credentials received at 406 are valid. For example, in embodiments an MAA agent can determine, at 410, if the session credentials are associated with an authentic client of the target system. In the ensuing description of method 400, "authenticated client" refers to an authentic client of a target system having the session credentials. If, at 410, the MAA agent determines that the credentials, received at 406, are not valid, at 426 the MAA agent terminates the login process. For example, at 426 an MAA agent can terminate a communications protocol connection, such as established at 402.

If, at 410, the MAA agent instead determines that the session credentials are valid, at 412 the MAA agent retrieves registered metrics of the authenticated client. Alternatively, in embodiments an MAA agent can omit step 410 and instead perform step 412, to retrieve the registered metrics. In embodiments, at 412 the MAA agent can, for example, retrieve the registered metrics from a database of registered metrics, or can retrieve a client profile associated with the authenticated client, and the client profile can include the registered metrics. The MAA agent can store registered metrics (and/or client profiles) and/or request registered metrics (e.g., a file or client profile including registered metrics) from another component of the MA system (e.g., the target system, and/or an ACS managing the target system), and/or another system communicatively coupled to the MA system or MAA agent. The MAA agent can utilize data included in the client profile to access registered metrics. The registered metrics can include, for example, registered metrics previously determined based on geographic and/or network locations, and/or determined using a metrics training method, such as method 300 of FIG. 3.

At 414, the MAA agent determines whether or not to continue authentication of the login client, using login metrics determined at steps 404 and/or 408 (hereinafter, "session metrics"). Alternatively, at 414 the MAA agent can determine not to continue authentication based on, for example, that the login client is sufficiently authenticated by the session credentials, that the registered metrics are not sufficient to continue authentication by comparison with the session metrics, and/or based on the login session comprising a metrics training session.

If, at 414, the MAA agent determines not to continue authentication of the login client, at 420 the MAA agent can, optionally, determine if the session metrics (or, metrics among the session metrics) should be included in registered metrics associated with the authenticated client (e.g., in or associated with the client profile retrieved at 412). In embodiments, an MAA agent can record session metrics as training metrics associated with the authenticated client, such as in addition to, or in lieu of, performing a metrics training method such as the example of method 300 in FIG. 3. For example, at 420 the MAA agent can determine to record session metrics among the registered metrics as a metrics training operation. In another example, an MAA agent can determine, at 420, to record session metrics among the registered metrics to improve the accuracy of the registered metrics.

If, at 420, the MAA agent determines to record session metrics among the registered metrics of the authentic client, at step 422 the MAA agent records the metrics and at step 424 the MAA agent continues client login processing. Similarly, if at 420, the MAA agent determines to not record session metrics among the registered metrics of the authentic client, at step 424 the MAA agent continues client login processing. In embodiments, continuing client login processing, at step 424, can comprise, for example, the MAA agent connecting the login client (e.g., via a communications protocol connection) with the target system as an authentic client of that target system. Continuing client login processing, at 424, can comprise the MAA agent determining particular permissions associated with the login client and resources of the target system, and/or performing additional authentication methods and/or protocols.

Alternatively, if at 414 the MAA agent determines to further authenticate the login client using the session metrics, at step 416 the MAA agent determines a "comporting status" of one or more of the session metrics. In embodiments a comporting status can comprise whether or not the session metrics comport with registered metrics. At 416 an MAA agent can determine, for example, that the session metrics comport with the registered metrics if metrics, among the session metrics, equal or are within a statistically acceptable range of the registered metrics. Session metrics that comport with the registered metrics can indicate that the login client is, or likely, is the authenticated client.

Alternatively, or additionally, at 416 an MAA agent can determine if session metrics deviate from the registered metrics. As previously described, session metrics can deviate from registered metrics, for example, if the login agent is located at a geographic location not normally used by a login agent of the authenticated client. For example, in a login session, an MAA agent may determine that a session metric is higher (e.g., a greater latency, or hop count) or lower (e.g., a lower latency, or hop count) in comparison to corresponding registered metrics associated with a particular login agent used by the authenticated client. Such a deviation can indicate that the client is a potentially fraudulent client attempting to login to the target system. Accordingly, at 416 the MAA agent can determine, based on the deviation of the session metrics from the registered metrics, that the session metrics do not comport with the registered metrics.

However, login metrics can vary among differing login sessions due to factors such as, for example, variations in network and/or network node utilization, and/or variations in network routes (e.g., particular inter-nodal connections) taken by communications and/or login protocol messages in differing login sessions. In another example, variations in processor utilization (e.g., utilization of a processor of a login agent or network component) can increase or decrease login metric values (e.g., network or data entry latencies) an MAA agent determines during a login session.

Accordingly, in embodiments registered metrics can include one or more nominal ranges of login metric values. Such nominal ranges can comprise, for example, low and high login metric values previously determined (e.g., in a metrics training process, or previous login sessions with an authentic client). In another example, a nominal range can comprise a statistical deviation around a statistical mean of previously determined login metrics. An MAA agent can determine a nominal range of registered metrics that can be associated with one particular geographic or network location used by an authentic client, and a different nominal range registered metrics for a different geographic or network location used by that client. Similarly, an MAA agent can determine a nominal range that can be associated with one particular login agent used by an authentic client, and a different nominal range for a different login agent used by that client. An MAA agent can record these nominal ranges among registered metrics of an authentic client (e.g., in a profile associated with the authentic client).

In embodiments, at 416 an MAA agent can determine if metrics, among the session metrics, are within the bounds of such nominal ranges. Accordingly, at 416 the MAA agent can determine that the session metrics comport with the registered metrics associated with the authentic client having the session credential based on metrics, among the session metrics, lying within the bounds of these ranges, while session metrics that lie outside the bounds of these ranges do not comport with the registered metrics. Based on the comparison, the MAA agent can perform a metrics-based login action.

Session metrics within the bounds of these ranges can indicate the login client is (or, likely is) the authenticated client, while session metrics outside the bounds of these ranges can indicate the login client is a potentially fraudulent client. If the MAA agent determines, at 416, that the session metrics comport with the registered metrics, the MAA agent performs a metrics-based login action comprising steps 420-424. At 420, as previously described, the MAA agent can determine, optionally, to record, at 422, the session metrics among the registered metrics and/or, at 424, continue login processing, such as previously described in reference to step 414.

At 416, if the MAA agent determines that metrics, among the session metrics, do not comport with the registered metrics, at 418 the MAA agent performs a metrics-based login action comprising one or more "non-comporting actions", such as to further assess the login client's authenticity and/or secure the target system from access by an unauthentic client. In embodiments, non-comporting actions can include, for example: terminating the login connection with the login client; preventing subsequent logins with those credentials pending a security action with the authenticated client; notifying MA system security administrators of the attempted login and session information; audit the login session; log information regarding the session and permit the login client to attempt to login again (e.g., for a limited number of repeat attempts) and permit the login client to login to the target system if a subsequent session comports with registered metrics; and/or logging the login client into a "honey pot" system that can simulate the target system, as observable by the login client, to collect forensic data about the login client.

In embodiments, an MAA agent can determine appropriate non-comporting actions based on a list, or set, of non-comporting metric actions defined for a particular authentic client, permissions of an authentic client to access particular resources of a target system, the nature or function of a target system and.ir resources of that system, and/or an MA system overall. For example, in embodiments an MAA agent can apply "sensitivity thresholds" to session metrics to authenticate a login client. Such sensitivity thresholds can be, for example, an amount by which a session metric value (e.g., a protocol latency) can exceed a value of a registered metric of an authentic client, or can be an amount by which a session metric value can lie outside of (below and/or above) a range of values of a registered metric of an authentic client and permit a login client to continue, as the authenticated client, login processing. A sensitivity threshold can be a statistical deviation of a session metric from a value of a registered metric of an authentic client, or from a range of values of a registered metric of an authentic client. An MA agent can determine to perform non-comporting metrics actions in response to session metrics that deviate beyond a particular sensitivity threshold of a registered metric.

In embodiments, sensitivity thresholds can correspond to access privileges of individual clients of a target system, and/or groups (e.g., particular client types or client organization) of clients of a target system. For example, a "deny access" sensitivity threshold can correspond to a value, or range of values, of a registered metric of an authentic client having high access privileges (e.g., super user, or root authority). A "high" sensitivity threshold can correspond to a value, or range of values, of a registered metric of an authentic client that has lesser privileges. In another example, a "high" sensitivity threshold can correspond to a particular statistical deviation, such as 1 statistical standard deviation, of a registered metric of an authentic client. A "nominal sensitivity threshold" can correspond to a broader range of statistical deviations, such as 2 statistical standard deviations, of a registered metric of an authentic client having limited privileges, or privileges that cannot damage or threaten security of a target system.

In embodiments, at 416 an MAA agent can determine whether a deviation in session metrics of a login client, from registered metrics of the authentic client, falls within or, alternatively, lies outside of a particular a sensitivity threshold associated with the authenticated client and, at 418, the MAA agent can perform a non-comporting action, such as those just described, corresponding to that sensitivity threshold. For example, if the authenticated client is associated with a "deny access" sensitivity threshold and a session metric does not comport with that threshold (e.g., deviates from values, or ranges of values corresponding to the deny access threshold, at 418 the MAA agent can take non-comporting actions that include terminating the login session (as in step 426 of method 400), or other actions to prevent access to, or otherwise secure the MA system against access by a potentially fraudulent login client. These actions can include actions such as re-directing the login client to a honey pot system, auditing session information, and/or preventing subsequent logins with the session credentials, in addition to terminating the login session or preventing access by the login client to the target system.

In another example, the authenticated client can have a level of access to the system that is associated with a high sensitivity threshold. If metrics among the session metrics do not comport with the registered metrics of the authenticated client, but fall within 1 standard deviation of the registered metrics, at 418 the MAA agent can take a non-comporting action that permits the login client to continue login with the target system.

Similarly, the authenticated client can have a level of access to the system that is associated with a nominal sensitivity threshold. If the session metrics do not comport with the registered metrics of the authenticated client, but fall within 2 standard deviations of the registered metrics, at 418 the MAA agent can take a non-comporting action that permits the login client to continue login processing, but possibly providing the login client with access to only particular resources of the target system, or with only particular types of access (e.g., read but not modify) to resources of the system, different from those available to the authenticated client logging.

As previously described, an MA computing system can associate login metrics with particular characteristics of a client, such as a type of a client (e.g., a human client versus an automated client), and/or a locality (e.g., a geographical and/or network location) of a client and/or login agent of a client relative to that of a computing system and/or MAA agent. For example, login metrics can indicate that a login client is a human client or, alternatively, is a computing system, or component of a computing system. An MA system can limit access to a target system to only authentic clients (or, only authentic clients having certain privileges, such as root privileges) logging into the system from a login device that is "local" (at a close geographical and/or network distance between a login client and the MA system and/or MAA agent). Latency and/or network metrics can indicate, for example, that a client attempting a login is using a login agent that is not local to the computing system, or that the client is not local to a login agent that is itself local to the computing system. For example, latencies, and/or hop counts, that exceed latencies and/or hop counts corresponding to a local login device, and/or a client located proximate (e.g., locally) to a local login agent, can indicate that the client and/or client login agent is not local and may, then, be a potentially fraudulent client.

Data entry metrics that are too low in value (e.g., in comparison to registered metrics of an authentic client, or of a particular type or class of client or client login agent) can indicate that the client is potentially a fraudulent client (such as a "bot" program responding much faster than is normal, or possible, for a human authentic client). Additionally, an MAA agent can determine that session metrics are within a tolerance of a sensitivity threshold (e.g., within a range of values of a sensitivity threshold) so as to require additional authentication methods.

Figure 4B:
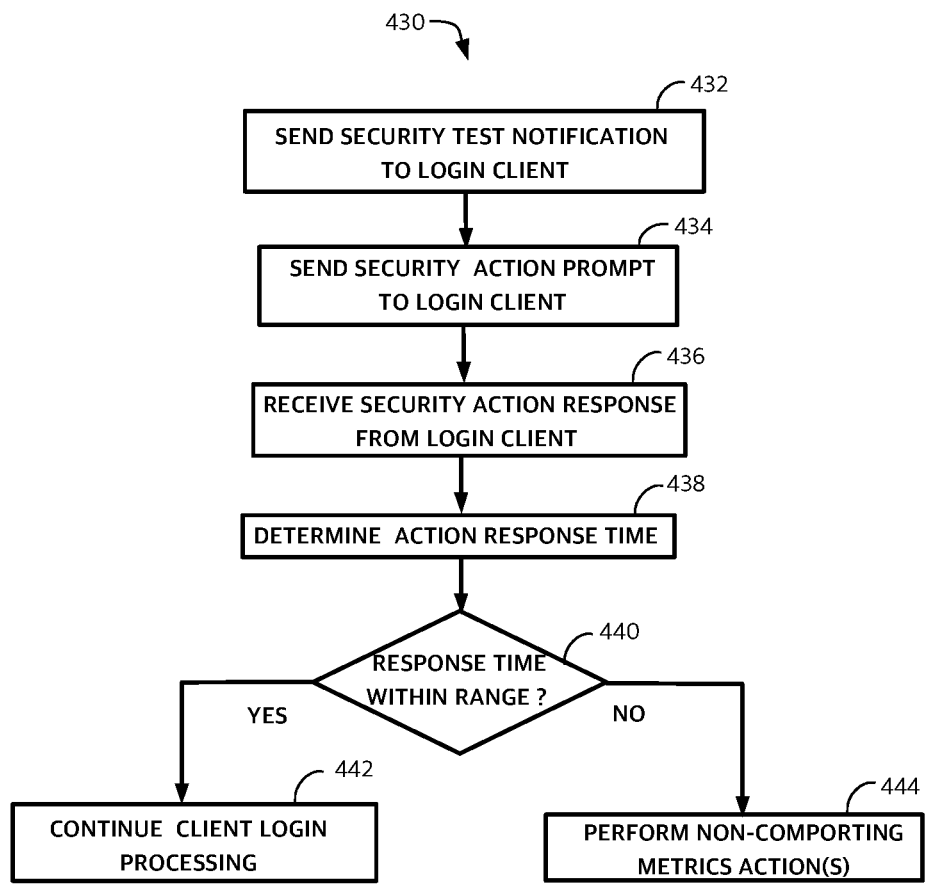
FIG. 4B illustrates a second example method utilizing login metrics to authenticate a login client, according to aspects of the disclosure.

In embodiments, an MAA agent can improve authentication of a login client by including a security test in a login process and determining login metrics associated with operations of the security test. Such a security test can utilize login metrics, such as previously described. To illustrate, FIG. 4B depicts example method 430 that an MAA agent can perform (or, can perform operations thereof) to include a security test in authenticating a login client. Method 430 can be included with other MAA authentication methods, such as example methods 300 and/or 400 of FIGS. 3 and 4A, or, alternatively, can be performed in place of such other methods. For example, an MAA agent can perform method 430 as part of or, alternatively, in lieu of, steps 418 and/or 424 of example method 400 in FIG. 4A. Similar to the description of method 400, method 430, of FIG. 4B, is described as performed by an MAA agent of an MA system interacting a with a login client (and/or a login agent of a login client) to access a target system.

At step 432 of method 430, the MAA agent sends a notification to a login client that the MAA agent will require a security action from the client (such as to continue a login process or session in steps 418 or 424 of method 400). At step 434, the MAA agent sends an action message (or, prompt) to the client, to which the client is expected to make a particular response and at step 436 the MAA agent receives the action response from the login client. At step 438, the MAA agent determines a login metric, such as the latency of the response from the time the MAA agent sent the action message, a protocol metric such as a hop count, and/or a data entry metric associated with the client entering the response. For example, at 432 the MAA agent can send a security test notification that includes a box having a particular color and that the client is to respond (e.g., click on a graphical user interface click-box) upon determining that the box has changed color. At 434 the MAA agent can send to the client the box having a different color, at 436 the MAA agent can receive the client response indicating that the client has detected the change in color, and at 438 the MAA agent can measure a response latency, such as the time from the MAA sending the box with the different color to the MAA receiving the client action response, a hop count associated with a network path of the client action response, and/or the time required for the client to enter a keystroke in response to the change in color.

At step 440, the MAA agent determines if the response latency is within a range of acceptable latencies. In embodiments, acceptable latencies can correspond to a type of authentic client (e.g., a human versus automated client), and/or to a locality of a client and/or login agent relative to the computing system and/or MAA agent. For example, at 440 the MAA agent can determine that a response latency is below a lowest latency value among a range of latency values corresponding to a human, versus an automated, authentic client. In another example, an MA system can limit login to a target system from a login agent located geographically local to the MA system and can have known protocol latencies corresponding to such a location. In such an MA system, an MAA agent can determine, at 440, that a response latency is within or, alternatively, is outside of a range of latency values corresponding to a local login agent to determine, or aide in determining, that a login client is an authentic client.

If the MAA agent determines, at 440, that the response latency is within the range of acceptable latencies, at 442, the MAA agent continues client login processing. In embodiments, at 442 the MAA agent can continue client login processing such as described with reference to step 424 of method 400 in FIG. 4A. Alternatively, df the MAA agent determines, at 440, that the response latency is not within the range of acceptable latencies, at 444, the MAA agent performs one or more non-comporting metrics action. In embodiments, at 444 the MAA agent can perform non-comporting metrics actions such as described with reference to step 418 of method 400 in FIG. 4A.

Figure 5:
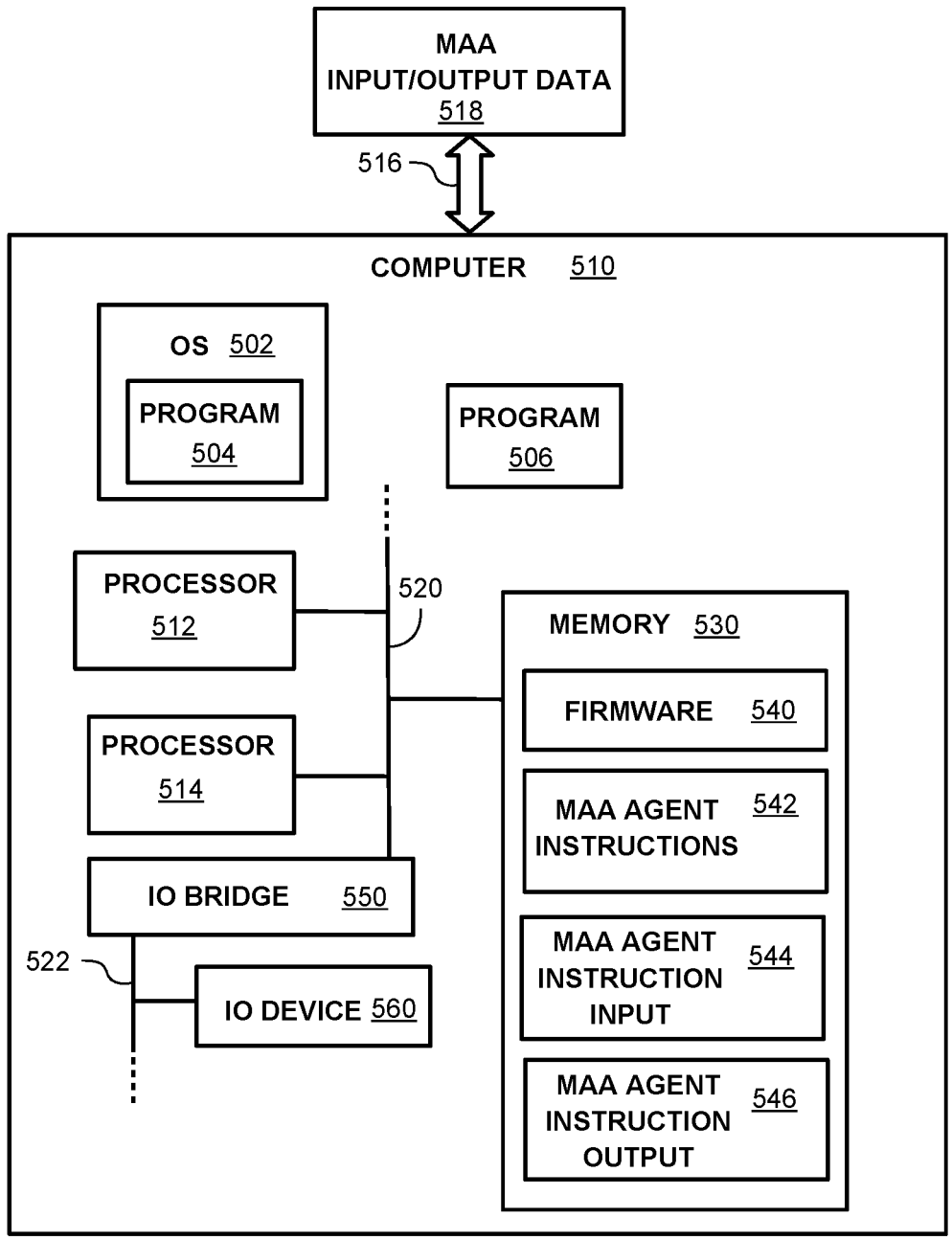
FIG. 5 illustrates an example computer embodiment, according to aspects of the disclosure.

As previously described, embodiments of the disclosure can comprise a computing system or device, and such embodiments can MAA methods, and/or operations thereof, such as the examples methods of FIGS. 3 and 4. FIG. 5 illustrates example computer 510, which can be a computing system or device of an MA system. For example, in an embodiment computer 510 can be included in an MAA agent, a target system, and/or a computing system for managing a target system.

FIG. 5 further depicts computer 510 configured to receive and/or communicate MAA Input/Output (I/O) Data 518 (hereinafter, "I/O data 518") via interface 516. In an embodiment I/O data 518 can comprise input data such as client credentials; communications and/or login protocol packets and/or messages; training and/or session latency and/or network metrics; a list, or set, of non-comporting metric actions; and/or registered metrics and/or profiles of authentic clients of a target system. I/O data 518 can comprise output data such as communications and/or login protocol packets and/or messages, training and/or session metrics to record; and/or outputs associated with performing non-comporting metrics actions (e.g., notifications to an MA and/or target system administrator of a potentially fraudulent client). Interface 518 can comprise a communications interface, such as a data bus or communications network, and computer 510 can receive or otherwise access such input data, and/or communicate such output data by means of interface 516. It would be apparent to one of ordinary skill in the art that the interface can be any of a variety of communications interfaces or mechanisms suitable for a computer, or a program operating in a computer, to receive or otherwise access MAA I/O data, and/or to present or otherwise communicate MAA I/O data.

As shown in FIG. 5, computer system 500 includes computer 510 having processors 512 and 514 and memory 530. In embodiments processors can be a single processor or a multi-threaded processor, a general purpose or a special purpose processor, a co-processor, or any of a variety of processing devices that can execute computing instructions. In embodiments a computing device can include one or more memories and processors of a computing device can be coupled to the memories.

In embodiments a memory can be a cache memory, a main memory, a flash memory, or a combination of these or other varieties of electronic devices capable of storing information and, optionally, making the information, or locations storing the information within the memory, accessible to a processor. A memory, in an embodiment, can be formed of a single electronic (or, in some embodiments, other technologies such as optical) module or can be formed of a plurality of memory modules. A memory, and/or or a memory module (e.g., an electronic packaging of a portion of a memory), in an embodiment can be, for example, one or more silicon dies or chips, or can be a multi-chip module package. Embodiments can organize a memory as a sequence of bytes, words (e.g., a plurality of contiguous or consecutive bytes), or pages (e.g., a plurality of contiguous or consecutive bytes or words).

Components of a computing device, such as computer 510, can be coupled to one or more memories by a memory interface, such as 520 in FIG. 5. A memory interface, such as 520, between a processor (or, processors) and a memory (or, memories) can be, for example, a memory bus common to one or more processors and one or more memories. In some embodiments, a memory interface, such as 520, between a processor and a memory can be point to point connection between the processor and the memory, and each processor in the computer can have a point-to-point connection to each of one or more of the memories. In other embodiments, a processor (for example, 512) can be connected to a memory (e.g., memory 530) by means of a connection (not shown) to another processor (e.g., 514) connected to the memory (e.g., 520 from processor 514 to memory 530).

In embodiments, a computing device, such as computer 510, can include an IO bridge, which can be connected to a memory interface, or (not shown), to a processor, for example. In some embodiments, an IO bridge can be a component of a processor or a memory. An IO bridge can interface the processors and/or memories of the computer (or, other devices) to IO devices connected to the bridge. For example, in FIG. 5 computer 510 includes IO bridge 550 interfacing memory interface 520 to IO devices, such as IO device 560. In some embodiments, an IO bridge can connect directly to a processor or a memory or can be a component included in a processor or a memory. An IO bridge can be, for example, a Peripheral Component Interface (PCI) Express or other IO bus bridge, or can be an IO adapter.

In embodiments an IO bridge can connect to IO devices by means of an IO interface, or IO bus, such as IO bus 522 of computer 510. For example, IO bus 522 can be a PCI-Express or other IO bus. In embodiments IO devices can be any of a variety of peripheral IO devices or IO adapters connecting to peripheral IO devices. For example, IO device 560 can be a graphic card, keyboard or other input device, a hard drive or other storage device, a network interface cards, etc. IO device 560 can be an IO adapter, such as a PCI-Express adapter, that connects components (e.g., processors or memories) of a computer to IO devices (e.g., disk drive es, Ethernet networks, video displays, keyboards, mice, etc.).

In embodiments, a computing device can include instructions executable by one or more processors (or, processing elements, such as threads of a processor). The instructions can be a component of one or more programs. The programs, or the instructions, can be stored in, and/or utilize, one or more memories of a computer. As illustrated in the example of FIG. 5, computer 510 includes a plurality of programs, such as program 504 and program 506. In an embodiment such a program can be, for example, an application program, an operating system or a function of an operating system, or a utility or built-in function of a computer. A program can be a hypervisor, and the hypervisor can, for example, manage sharing resources of the computer (e.g., a processor or regions of a memory, or access to an IO device) among a plurality of programs or OSes. A program can be a program that embodies the methods, or portions thereof, of the disclosure. A program can be a program that embodies the methods, or portions thereof, of the disclosure. For example, in an embodiment a program can be a program that executes on a processor of computer 510 to perform operations of example methods 300 and/or 400, of FIGS. 3 and 4, respectively.

In embodiments, programs can be "stand-alone" programs, and such stand-alone programs can execute on processors and use memory within a computing device directly, without requiring another program to control their execution or their use of resources of the computing device. For example, in FIG. 5 computer 510 includes stand-alone program 506. In an embodiment a stand-alone program can perform particular functions within the computer, such as controlling, or interfacing (e.g., for access by other programs) an IO interface or IO device. A stand-alone program can, for example, manage the operation, or access to, a memory. A Basic I/O Subsystem (BIOS), or a computer boot program (e.g., a program that can load and initiate execution of other programs) can be a standalone program.

In embodiments a computing device can include one or more operating systems, and an operating system can control the execution of other programs such as, for example, to start or stop a program, or to manage resources of the computer used by a program. For example, computer 510 includes operating system (OS) 502, which can include, or manage execution of, one or more programs, such as OS 502 including (or, managing) program 504. In some embodiments, an operating system can function as a hypervisor, and/or a computing system can include a hypervisor (not shown in FIG. 5).

A program can be embodied as firmware (e.g., BIOS in a desktop computer, or a hypervisor) and the firmware can execute on one or more processors and, optionally, can use memory, included in the computer. Firmware can be stored in a memory (e.g., a flash memory) of the computer. For example, computer 510 includes firmware 540 stored in memory 530. In other embodiments, firmware can be embodied as instructions (e.g., comprising a computer program product) on a storage medium (e.g., a CD ROM, a flash memory, or a disk drive), and the computer can access the instructions from the storage medium.

In embodiments, a memory of, or coupled to, a computing device can store instructions executable by a processor of a computing device. For example, as illustrated in FIG. 5 memory 530 includes firmware 540 and MAA agent instructions 542, which can include instructions executable by processors of computer 510, such as 512 and/or 514, and can perform operations of methods of the disclosure, such as operations of example methods 300 and/or 400, of FIGS. 3 and 4, respectively. In embodiments, firmware 540 can include MAA agent instructions (not shown in FIG. 5) to perform methods and/or operations of the disclosure.

In embodiments, a memory of, and/or coupled to, a computing device can store input data, such as can be used by the instructions. For example, as also shown in FIG. 5, memory 530 includes MAA agent instruction input 544. In an embodiment, MAA agent instruction input 544 can include data (e.g., data included in I/O data 518) used by MAA agent instructions 542 in performing operations of methods and/or operations of the disclosure. Similarly, in an embodiment a memory of, or coupled to, a computing device can store output data, such as the results of executing the instructions. As illustrated in FIG. 5, memory 530 includes MAA agent instruction output 546, which can comprise, in an embodiment, the results of executing instructions, such as instructions included in firmware 540, programs 504 and/or 506, and/or MAA agent instructions 542 performing of methods and/or operations of the disclosure (e.g., data included in I/O data 518).

The example of computer 510, in FIG. 5, is not intended to limit embodiments. In embodiments, computer system 500 can include a plurality of processors and/or interfaces not shown in FIG. 5 and can include other elements or components, such as networks, network routers or gateways, storage systems, server computers, virtual computers or virtual computing and/or IO devices, cloud-computing systems, and so forth. It would be evident to one of ordinary skill in the art to include a variety of devices interconnected in a variety of manners in a computing device and/or computing system embodying aspects and features of the disclosure.

For example, with reference again to FIG. 5, in embodiments computer 510 can be a desktop or laptop computer; a tablet computer, mobile computing device, or cellular phone; or, a server computer, a high-performance computer, or a supercomputer. Computer 510 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one of ordinary skill in the art that a computing device, and/or computing system, embodying aspects and features of the disclosure can be any of a variety of computing devices having processors and, optionally, memories and/or programs.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

receiving, by a computer-implemented metrics-augmented authentication agent (MAA agent), from a login agent, input login data associated with a login process of a target computing system, the input login data associated with a login of a login client to the target computing system;

determining, by the MAA agent, an input login metric associated with the login of the login client to the target computing system, the input login metric selected from a login metric group consisting of: an Internet Protocol (IP) Time to Live (TTL) included in a first protocol message associated with the login process, a network hop count included in a second protocol message associated with the login process, and a network node list included in a third protocol message associated with the login process;

the MAA agent receiving, from the login agent, login credentials, among the input login data, corresponding to an authentic client of the target computing system;

the MAA agent retrieving, based on the login credentials, registered login metrics associated with the authentic client, the registered login metrics comprising login metrics selected from the login metric group, the registered login metrics further associated with the authentic client performing an authorized login to the target computing system;

the MAA agent comparing a value of the input login metric to a value of an authenticated metric included in the registered login metrics, the authenticated metric selected from the login metric group and corresponding to the input login metric;

the MAA agent determining, based on the MAA agent comparing the value of the input login metric to the value of the authenticated metric, a comporting status of the input login metric; and, the MAA agent performing, based on the comporting status of the input login metric, a metrics-based authentication action.

2. The method of claim 1, wherein the first, the second, and the third protocol messages are selected from a protocol message group consisting of: a message of a network connection protocol; a message of a network communications protocol; a message of a login protocol associated with the login process; a security action response message of a security protocol; a message responsive to an action message of the MAA agent; a message associated with the MAA agent receiving the login credentials; and, a response message of a login metrics training protocol.

3. The method of claim 1, the method further comprising the MAA agent determining the registered login metrics in a training mode of the MAA agent, the training mode comprising:
monitoring, by the MAA agent, an authorized login of the authentic login client to the target computing system; and,
recording, among the registered login metrics, by the MAA agent in response to the monitoring the authorized login, the authenticated login metric.

4. The method of claim 1, wherein the value of the authenticated metric is selected from a login metric range; and,
wherein the method further comprises:
the MAA agent comparing the value of the input login metric to the value of the authenticated metric selected from the login metric range;
the MAA agent determining, based on the comparing the value of the input metric to the value of the authenticated metric selected from the login metric range, the value of the input metric to be not within the login metric range; and,
wherein the MAA agent determining the comporting status comprises the MAA agent determining, based on the determining the value of the input metric to be not within the login metric range, that the comporting status comprises that the input login metric does not comport with the registered login metrics.

5. The method of claim 1, wherein the MAA agent comparing the value of the input login metric to the value of the authenticated metric comprises the MAA agent comparing the value of the input login metric to a sensitivity threshold selected from a threshold group consisting of: an amount by which the value of the input login metric can lie above a range of values of the authenticated metric, an amount by which the value of the input login metric can lie below a range of values of the authenticated metric, a threshold associated with an access privilege of the authentic client, and a statistical deviation of the value of the input login metric from the value of the authenticated metric.

6. The method of claim 1, wherein the registered login metrics further comprise a common typographical pattern associated with the authentic client entering data associated with the login process; and,
wherein the MAA agent determining the comporting status of the input login metric based on the MAA agent comparing the value of the input login metric to the value of the authenticated metric comprises the MAA agent determining the comporting status based further on comparing a data entry pattern, associated with the login client entering data among the input login data, to the common typographical pattern associated with the authentic client.

7. The method of claim 6, wherein the common typographical pattern is selected from a typographical group consisting of: a backspacing pattern of the authentic client entering the data associated with the login process, a common typographical error of the authentic client entering the data associated with the login process and a common typographical error of the authentic client typing a security answer.

8. The method of claim 1, wherein the method further comprises the MAA agent determining, based on the input login metric, that the login client is a non-human client, the non-human client further comprising a fraudulent client of the target computing system.

9. The method of claim 1, wherein the method further comprises the MAA agent determining, based on the MAA agent comparing the value of the input login metric to the value of the authenticated metric, that the comporting status comprises that the input login metric comports with the registered login metrics; and,
wherein, based upon the MAA agent determining that the comporting status comprises that the input login metric comports with the registered login metrics, MAA performing the metrics-based authentication action comprises the MAA performing a comporting action.

10. The method of claim 1, wherein the method further comprises the MAA agent determining, based on the MAA agent comparing the value of the input login metric to the value of the authenticated metric, that the comporting status comprises that the input login metric does not comport with the registered login metrics; and,
wherein, based upon the MAA agent determining that the comporting status comprises that the input login metric does not comport with the registered login metrics, the MAA performing the metrics-based authentication action comprises the MAA performing a non-comporting action.

11. The method of claim 10, wherein the non-comporting action is selected from an action group consisting of: the MAA agent denying the login client access to the target computing system; the MAA agent redirecting the login client to a honey pot system; the MAA agent auditing a login session associated with the login process; the MAA agent limiting an access privilege of the login client to an access level less than an access privilege of the authentic client; the MAA agent terminating a first connection between the login agent and the target computing system; the MAA agent preventing a subsequent login to the target computing system by any login client using the login credentials; the MAA agent communicating to a system administrator regarding that the input login metric does not comport with the registered login metrics; the MAA agent auditing a second connection between the login agent and the target computing system;
the MAA agent logging information regarding a third connection between the login agent and the target computing system; and, the MAA agent receiving a repeat protocol message from the login agent and, based on a login metric associated with the repeat protocol message, the MAA agent determining a comporting status associated with the repeat protocol message.

12. A computing system, the computing system comprising:
a target computing system;
a metrics-augmented authentication agent (MAA agent), the MAA agent comprising a hardware processor; and,
a login agent, the login agent communicatively coupled to the MAA agent,
wherein the MAA agent is configured to:
receive, from the login agent, input login data associated with a login process of the target computing system, the input login data associated with a login of a login client to the target computing system;
determine an input login metric associated with the login of the login client to the target computing system, the input login metric selected from a login metric group consisting of: an Internet Protocol (IP) Time to Live (TTL) included in a first protocol message associated with the login process, a network hop count included in a second protocol message associated with the login process, and a network node list included in a third protocol message associated with the login process;

receive, from the login agent, login credentials, among the input login data, corresponding to an authentic client of the target computing system;

retrieve, based on the login credentials, registered login metrics associated with the authentic client, the registered login metrics comprising login metrics selected from the login metric group, the registered login metrics further associated with the authentic client performing an authorized login to the target computing system;

compare a value of the input login metric to a value of an authenticated metric included in the registered login metrics, the authenticated metric selected from the login metric group and corresponding to the input login metric;

determine, based on the comparing the value of the input login metric to the value of the authenticated metric, a comporting status of the input login metric; and, perform, based on the comporting status of the input login metric, a metrics-based authentication action.

13. The computing system of claim 12, wherein the first, the second, and the third protocol messages are selected from a protocol message group consisting of: a message of a network connection protocol; a message of a network communications protocol; a message of a login protocol associated with the login process; a security action response message of a security protocol; a message responsive to an action message of the MAA agent; a message associated with the MAA agent receiving the login credentials; and, a response message of a login metrics training protocol.

14. The computing system of claim 12, wherein the MAA agent is further configured to determine the registered login metrics in a training mode of the MAA agent, the training mode comprising the MAA agent configured to:
monitor an authorized login of the authentic login client to the target computing system; and,
record among the registered login metrics, in response to the monitoring the authorized login, the authenticated login metric.

15. The computing system of claim 12, wherein the MAA agent is further configured to determine, based on the comparing the value of the input login metric to the value of the authenticated metric, that the comporting status comprises that the input login metric does not comport with the registered login metrics;
wherein the MAA agent configured to perform the metrics-based authentication action based on the comporting status comprises the MAA agent further configured to perform a non-comporting metrics action based on the determining that the comporting status comprises that the input login metric does not comport with the registered login metrics; and,
wherein the non-comporting action is selected from an action group consisting of: the computing system denying the login client access to the target computing system; the computing system redirecting the login client to a honey pot system; the computing system auditing a login session comprising the login process; the computing system limiting an access privilege of the login client to the target computing system to an access level less than an access privilege of the authentic client; the computing system terminating a first connection between the login agent and the target computing system; the computing system preventing a subsequent login to the target computing system by any login client using the login credentials; the computing system communicating to a system administrator regarding the login metrics not comporting with the registered login metrics; the computing system auditing a second connection between the login agent and the target computing system; the computing system logging information regarding a third connection between the login agent and the target computing system; and, the MAA agent receiving a repeat protocol message from the login agent and the MAA agent determining a comporting status of the repeat protocol message.

16. The computing system of claim 12, wherein the MAA agent configured to compare the value of the input login metric to the value of the authenticated metric comprises the MAA agent further configured to compare the value of the input login metric to a sensitivity threshold selected from a threshold group consisting of: an amount by which the value of the input login metric can lie above a range of values of the authenticated metric, an amount by which the value of the input login metric can lie below a range of values of the authenticated metric, a threshold associated with an access privilege of the authentic client, and a statistical deviation of the value of the input login metric from the value of the authenticated metric.

17. The computing system of claim 12, wherein the value of the authenticated metric is selected from a login metric range;
wherein the MAA agent configured to compare the value of the input login metric to the value of the authenticated metric comprises the MAA agent further configured to compare the value of the input login metric to the value of the authenticated metric selected from the login metric range; and,
wherein the MAA agent configured to determine, based on the comparing the value of the input metric to the value of the authenticated metric, the comporting status comprises the MAA agent further configured to determine, based on the comparing the value of the input login metric to the value of the authenticated metric selected from the login metric range, that the comporting status comprises that the input login metric does not comports with the registered login metrics.

18. The computing system of claim 12, wherein the MAA agent is further configured to determine, based on the input login metric, that the login client is a non-human client, the non-human client further comprising a fraudulent client of the target computing system.

19. The computing system of claim 12, wherein the registered login metrics further comprise a common typographical pattern associated with the authentic client entering data associated with the login process; and,
wherein the MAA agent configured to determine the comporting status of the input login metric based on the comparing the value of the input login metric to the value of the authenticated metric comprises the MAA agent further configured to determine the comporting status of the input login metric based further on the MAA agent comparing data entry pattern, associated with the login client entering data among the input login data, to the common typographical pattern associated with the authentic client.

20. The computing system of claim 19, wherein the common typographical pattern is selected from a typographical group consisting of: a backspacing pattern of the authentic client entering the data associated with the login process, a common typographical error of the authentic client entering the data associated with the login process, and a common typographical error of the authentic client typing a security answer.

* * * * *